(12) United States Patent
Fensore et al.

(10) Patent No.: US 6,353,866 B1
(45) Date of Patent: Mar. 5, 2002

(54) APPARATUS AND METHOD FOR INITIALIZING A UNIVERSAL SERIAL BUS DEVICE

(75) Inventors: David J. Fensore, New Gloucester; Kent Bruce Waterson, South Portland; Gregory Lewis Dean, Standish; Robert Macomber, Portland, all of ME (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/003,925

(22) Filed: Jan. 7, 1998

(51) Int. Cl.⁷ .............................................. G06F 13/00
(52) U.S. Cl. ........................................ 710/104; 710/8
(58) Field of Search ............................. 710/8, 10, 102, 710/103, 104, 126, 129

(56) References Cited

U.S. PATENT DOCUMENTS

| | | | |
|---|---|---|---|
| 5,675,813 A | * 10/1997 | Holmdahl | 713/310 |
| 5,729,721 A | 3/1998 | Bettelheim et al. | |
| 5,751,951 A | 5/1998 | Osborne et al. | |
| 5,778,218 A | 7/1998 | Gulick | 710/60 |
| 5,818,948 A | 10/1998 | Gulick | 381/77 |
| 5,835,791 A | 11/1998 | Goff et al. | 710/62 |
| 5,841,471 A | 11/1998 | Endsley et al. | 348/231 |
| 5,848,293 A | 12/1998 | Gentry | 710/5 |
| 5,875,351 A | 2/1999 | Riley | |
| 5,901,332 A | 5/1999 | Gephardt et al. | 710/41 |
| 6,009,480 A | * 12/1999 | Pleso | 710/8 |

OTHER PUBLICATIONS

USB Feature Specification: Shared Endpoints; SystemSoft Corporation, Intel Corporation; pp. i–iii, 1–14; Dec. 4, 1997.
Universal Serial Bus Common Class Specification; SystemSoft Corporation, Intel Corporation; pp. i–v, 1–14; Nov. 4, 1997.
Universal Seril Bus Specification; Compaq, Digital Equipment Corporation, IBM PC Company, Intel, Microsoft, NEC, Northern Telecom; pp. 1–268; Jan. 15, 1996.
8x930Ax, 8x930Hx Users Manual; Intel; pp. 6.1–10.1 Appendix B–D; 1997.
U.S. application No. 09/003,963, filed Jan. 7, 1998.
U.S. application No. 09/004,003, filed Jan. 7, 1998.
U.S. application No. 09/003,897, filed Jan. 7, 1998.
U.S. application No. 09/004,002, filed Jan. 7, 1998.
U.S. application No. 09/004,005, filed Jan. 7, 1998.
U.S. application No. 09/004,002, filed Jan. 7, 1998.

* cited by examiner

Primary Examiner—Glenn A. Auve
(74) Attorney, Agent, or Firm—Stallman & Pollock LLP

(57) ABSTRACT

A method and apparatus for dynamically assigning and enabling a unique functional address for a Universal Serial Bus device. A host assigns the unique functional address during a control transaction. The Universal Serial Bus device disables the default address and enables the unique functional address during a status stage of the control transaction to avoid an error window.

4 Claims, 7 Drawing Sheets

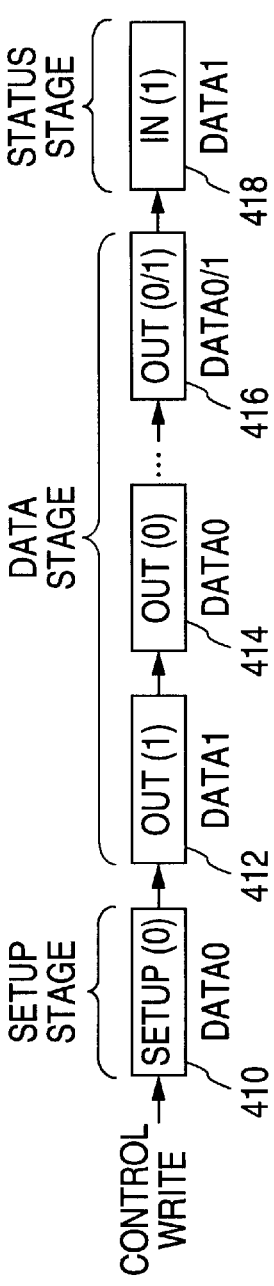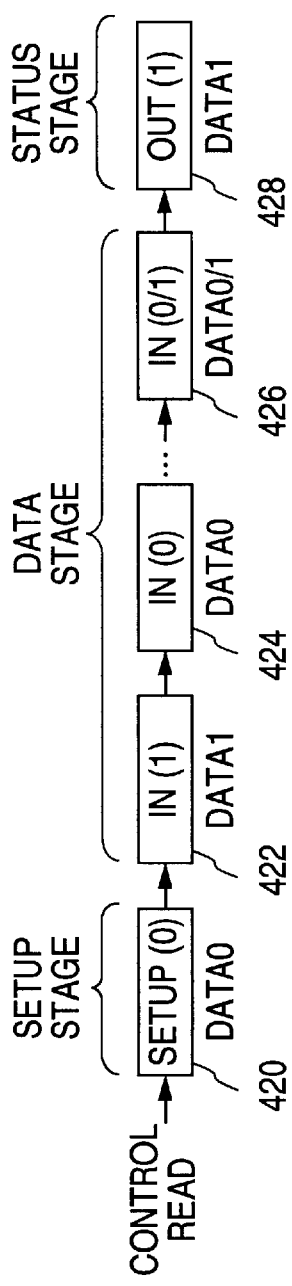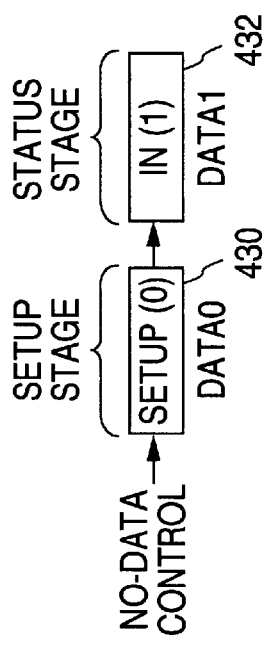
FIGURE 4A (PRIOR ART)
FIGURE 4B (PRIOR ART)
FIGURE 4C (PRIOR ART)

| 31 | 30 | 24 | 23 | 22 | 16 | 15 | 14 | 8 | 7 | 6 | 0 |
|---|---|---|---|---|---|---|---|---|---|---|---|
| AE3 | FA3 | | AE2 | FA2 | | AE1 | FA1 | | AE0 | FA0 | |

| 15 | 14 | 13 | 12 | 11-9 | 8 | 7-5 | 4 | 3-2 | 1 | 0 |
|---|---|---|---|---|---|---|---|---|---|---|
| res-DIAG | SFM | res | ETE | res for other EPMS | EPMS | res for DEF3-1 | DEF0 | res | ECE | NAT |

APPARATUS AND METHOD FOR INITIALIZING A UNIVERSAL SERIAL BUS DEVICE

BACKGROUND OF THE INVENTION

1. Field of the Invention

This apparatus and method relates to initializing a Universal Serial Bus device and, in particular, to assigning a unique functional address to a Universal Serial Bus device.

2. Description of the Related Art

Universal Serial Bus (USB) is a standard peripheral interface for attaching personal computers to a wide variety of devices: e.g., digital telephone lines, monitors, modems, mice, printers, scanners, game controllers, keyboards, and other peripherals. A USB thus replaces existing interfaces such as the RS-232C serial ports, parallel ports, PS/2 interface and game/MIDI ports.

In accordance with USB, all attached devices connect to a personal computer through a single connector type using a tiered-star topology. A host personal computer includes a single USB controller. The host controller provides the interface between the USB network and the host personal computer. The host controller controls all accesses to USB resources and monitors the bus topology. A USB hub provides USB attachment points for USB devices.

An example of the tiered-star topology of a USB network is shown in FIG. 1. Host PC 100 is a typical personal computer having a USB port connection via host controller 102. Host controller 102 connects directly to hub 110. Compound device 120, hub 130, and device 140 connect to the host controller 102 through hub 110. Devices 132 and 134 connect to the host controller 102 through hub 130 and through hub 110.

Compound device 120 includes devices 124, 126 and hub 122. Hub 122 of compound device 120 connects to the host controller through hub 110. Devices 124 and 126 of compound device 120 connect to the host controller 102 through hub 122 and through hub 110. A practical example of a compound device would be an integrated printer and fax. The printer could be device 124, and the fax could be device 126.

The tiered-star topography illustrated in FIG. 1 allows data to be transmitted into and out of the host PC 100 to the various devices. When data is transmitted from the host to a device it is transmitted downstream through the interconnecting hubs. When data is transmitted from a device to the host it is transmitted upstream through the interconnecting hubs.

USB hubs and devices may be connected and disconnected without completely re-starting the USB network. Upon connection of a device or hub to an upstream hub the upstream hub will notify the host controller of a change in status. Following USB protocol, the host controller will enable the port of the hub to which the device is connected. The host controller will then assign a unique functional address to each device. Ports are enabled one at a time as the host controller 102 assigns unique functional addresses. Upon connection of a compound device, the host controller assigns a unique functional address to each device contained within the compound device. Returning to FIG. 1, devices 124, 126, 132, 134, and 140 in addition to hubs 110, 122, and 130 will each be assigned a unique functional address upon attachment to the USB network.

Devices 124, 126, 132, 134, and 140 in addition to hubs 110, 122, and 130 will each respond to a default address of 00h until they are assigned the unique functional address. Each of the devices include registers which may be read by the host controller. The registers include a default (DEF) bit, a functional address enable (AE) bit, and a functional address register (FAR). The default bit indicates whether the device will respond to the default address. If it is set, the device will respond to the default address, if it is cleared it will not. The functional address enable bit indicates whether the device will respond to the address stored in the functional address register. If it is set, the device will respond to the address stored in the functional address register, if it is cleared it will not.

All of the devices 124, 126, 132, 134, and 140 attach to the host controller 102 through at least one hub. Each hub has one upstream port and at least one downstream port. Upon attachment or removal of a device on a downstream port, a hub will notify the host controller of a change in status. The host controller then queries the hub to determine the change in status on the hub's ports.

Upon attachment of a device to one of a hub's downstream ports, the above procedure is followed to notify the host controller of the attachment of a new device. A hub's downstream ports are by default disabled until the host controller enables them. Consequently, the host controller will enable the port.

Upon removal of a device from one of a hub's downstream ports, the hub automatically disables the appropriate port and notifies the host of the change. The host controller updates the topography status to reflect the change.

The process of activating a newly attached device will now be described in greater detail. When a device is attached to a downstream port of a hub, the hub will notify the host controller of the change in status via a status change pipe. The host controller queries the hub to determine which of the downstream ports have experienced a connection. The host controller then issues a port enable and reset command to the appropriate port. The enable command enables the port and provides power to the device. The reset command resets all of the devices registers and state information. The device will respond to a default address and is accessible over a default pipe. The host controller then reads a device descriptor to determine the characteristics of the default pipe. The host then assigns a unique functional address to the device thereby moving the device to the addressed state. The host then reads the configuration information from the device, and writes a configuration value to the device. This moves the device to the configured state.

The transaction for assigning a unique functional address during the above described activation process will now be described in greater detail. These transactions are first described generally, then are described as applied to assigning a unique functional address.

The USB specification defines a control transfer protocol for use in configuring a device. A control transfer is composed of a setup transaction which moves request information from the host to the device, optional data transactions which send data in the direction indicated by the setup transaction, and a status transaction which returns status information from the device to the host.

The occurrence of an IN or OUT data transaction in the control transaction provide three possible transaction sequences: a control write sequence, a control read sequence, and a control no-data sequence. Each of these will now be described in greater detail.

Turning to FIG. 4A, a control write sequence is shown. The control write sequence includes three stages: a setup stage, a data stage and a status stage. The setup stage consists of a SETUP transaction 410 having a DATA0 PID. The SETUP transaction 410 specifies that an OUT data stage will follow. The data stage consists of an OUT transaction 412 having a DATA1 PID. The OUT transaction 412 is followed by an OUT transaction 414 having a DATA0 PID. This transaction is followed by as many transactions as are required to transmit the necessary data from the host. This will depend both upon the size of the data in the host and the size of the transmitted packets. The DATA PID alternates between 1 and 0 for the OUT transactions used in the data stage. The final OUT transaction 416 ends the data stage. The status stage consists of a single IN transaction 418 having a DATA1 PID.

Turning to FIG. 4B, a control read sequence is shown. The control data IN sequence includes three stages: a setup stage, a data stage and a status stage. The setup stage consists of a SETUP transaction 420 having a DATA0 PID. The SETUP transaction 420 specifies that an IN data stage will follow. The data stage consists of an IN transaction 422 having a DATA1 PID. The IN transaction 422 is followed by an IN transaction 424 having a DATA0 PID. This token is followed by as many transaction as are required to transmit the necessary data from the device. This will depend both upon the size of the data in the device and the size of the transmitted packets. The DATA PID alternates between 1 and 0 for the IN transactions used in the data stage. The final IN transaction 426 ends the data stage. The status stage consists of a single IN transaction 428 having a DATA1 PID.

Turning to FIG. 4C, a control no-data sequence is shown. The control no-data sequence includes two stages: a setup stage and a status stage. The setup stage consists of a SETUP transaction 420 having a DATA0 PID. The status stage consists of a single OUT transaction 428 having a DATA1 PID.

A flow chart illustrating a setup transaction is shown in FIG. 3. The transaction begins with SETUP token 310 sent from the host. A setup transaction always includes a DATA0 PID for the data field. The device then responds by sending an ACK handshake to complete the SETUP transaction.

A flow chart illustrating an IN transaction is shown in FIG. 5. The IN transaction begins with an IN token 510 which is sent from the host to the device. The device should then respond with the appropriate DATA packet 512 (either a DATA0 or a DATA1 packet). If, however, the device is temporarily unable to return a DATA packet, it will instead return NAK handshake 514. If the device is unable to return a DATA packet and will require host intervention to recover, it will return a STALL handshake 516. Returning to DATA packet 512, the host will respond with an ACK handshake 518 upon receipt of this packet.

A flow chart illustrating an OUT transaction is shown in FIG. 6. The OUT transaction begins with an OUT token 610 which is sent from the host to the device. The host then sends the appropriate DATA packet 612 (either a DATA0 or a DATA1 packet). If the device receives DATA packet 612 without errors and is ready to receive another packet, it returns ACK handshake 614. If the device receives DATA packet 612 without errors but needs the host to resend the packet, it returns NAK handshake 616. The NAK handshake is used when a DATA packet's intended function is in a state which temporarily prevents it from receiving the DATA packet. If the device receives the DATA packet 612 but is in a stall condition, it returns a STALL handshake to indicate that the host should not attempt to resend the packet. If the data packet 612 is received with a CRC or bit stuffing error, no handshake is returned.

Upon connection of a device to a host port, the host will use a control write transfer to assign a unique functional address. As described above, a successful control write transfer consists of a SETUP transaction, at least one OUT transactions, and an IN transaction. The SETUP transaction is addressed to the default address. The OUT transaction(s) include the unique functional address for the device. The IN transaction consists of the IN token from the host, a zero-length DATA1 packet from the device to the host, and an ACK handshake from the host to the device.

To enable the functional address, each of the devices 124, 126, 132, 134, and 140 and hubs 110, 122 and 130 in turn sets a functional address bit. After completion of the OUT transactions of a setup control transfer for assigning a unique functional address, a device has received the unique functional address. This address is loaded into the device's functional address register, and the address enable bit is set. The host then sends an IN token to begin the status stage of a setup control transfer. The status stage is used to confirm completion of the control transfer. Having loaded a unique functional address, the default address bit is cleared upon receipt of the following IN token. The device simultaneously sends a DATA1 packet to the host. The DATA1 packet indicates that the endpoint is now in a condition to be addressed by the host. If the device is experiencing temporary delays, it can transmit instead a NAK handshake packet. Alternatively, if the device is experiencing an error condition, it can transmit a STALL to indicate that the host should not attempt to resend data.

On many USB networks, the transmission of data is not completely errorless. Occasionally data transmissions are corrupted, and any of the above described transmissions may be corrupted.

For example, the zero-length DATA1 packet sent by the device during the status stage may be corrupted or simply lost on it's way through the USB network to the host. During the window of time after such a loss, the host will not send the appropriate ACK because it has not properly received the DATA1 packet.

Instead, the host may attempt to restart the setup control transfer by sending a SETUP token or an IN token to the default address of the device. As the device has cleared the default address bit, it will no longer respond to this token.

Additionally, the host may have already enabled another hub port connected to an as yet unconfigured device. Although the SETUP token is not directed to the unconfigured device, it will respond. Such a response may cause further errors particularly in the hosts monitoring to the bus topography.

Accordingly, methods and apparatus for avoiding the potential errors resulting from the corruption or loss of data transmissions during the setup control transfer are desired.

SUMMARY OF THE INVENTION

It is an object of the invention to provide for robust assignment of a functional address using a setup control transfer.

It is a further object of the invention to complete a functional address assignment even where some of the data transmitted during a setup control transfer may be lost or corrupted.

It is an advantage of the invention to avoid the undefined window of time following the loss or corruption of a status stage DATA1 packet.

It is a feature of one aspect of the invention to enable a unique functional address upon receipt of a valid ACK after the status phase or on a SETUP token for another device.

It is a feature of the invention to accept address assignment in compound devices having multiple functional addresses.

According to one aspect of the invention a USB device has a default address, and a default address enable bit wherein the default address enable bit enables the use of the default address. The device receives an IN token from a host; sends a DATA1 packet to the host; receives an ACK from the host; and clears the default address bit only after receiving the ACK.

According to another aspect of the invention a USB device has a default address, and a default address enable bit wherein the default address enable bit enables the use of the default address. The device receives an IN token from a host; sends a zero-length DATA1 packet to the host; receives a SETUP packet from the host; and clears the default address enable bit upon receipt of the SETUP packet.

According to another aspect of the invention a USB network includes a host and a plurality of devices, wherein the devices are of the type having a default address and a default address enable bit, and further wherein the default address enable bit enables the use of the default address. A method for operating the USB network sends an IN token from the host to a first device; receives the IN token by the first device; sends a DATA1 packet from the first device to the host; receives the DATA1 packet by the host; sends an ACK from the host to the first device; sends a SETUP token from the host to a second device; and clears the default address bit of the first device upon receipt of one of the ACK or the SETUP token.

According to another aspect of the invention, a USB device utilizes a default address enable bit, wherein when the default address enable bit is set the USB device responds to a default address and when the default address bit is cleared the USB device does not respond to the default address, and further wherein the default address enable bit is cleared upon receipt of an ACK handshake during a status stage of a control transfer.

These and other objects, features, and advantages will become apparent when considered with reference to the following description and the accompanying drawings.

BRIEF DESCRIPTION OF THE DRAWINGS

FIG. 4A is a flow chart showing data flow over a USB network during a control write transfer.

FIG. 4B is a flow chart showing data flow over a USB network during a control read transfer.

FIG. 4C is a flow chart showing data flow over a USB network during a control no-data transfer.

FIG. 7 is a functional address register for a USB device according to one preferred embodiment of the invention.

FIG. 8 is a device control register for a USB device according to one preferred embodiment of the invention.

DETAILED DESCRIPTION OF THE PREFERRED EMBODIMENTS

Figure 1:
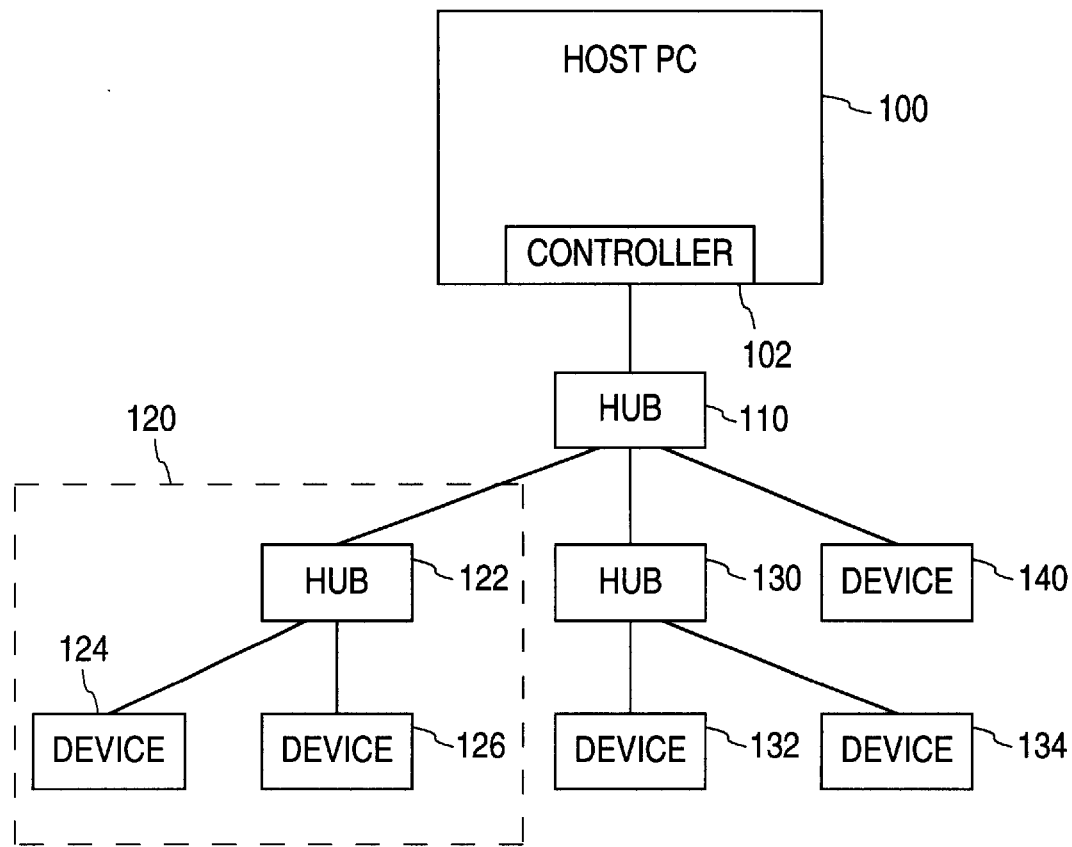
FIG. 1 is a block diagram of a Universal Serial Bus network.
Figure 2:
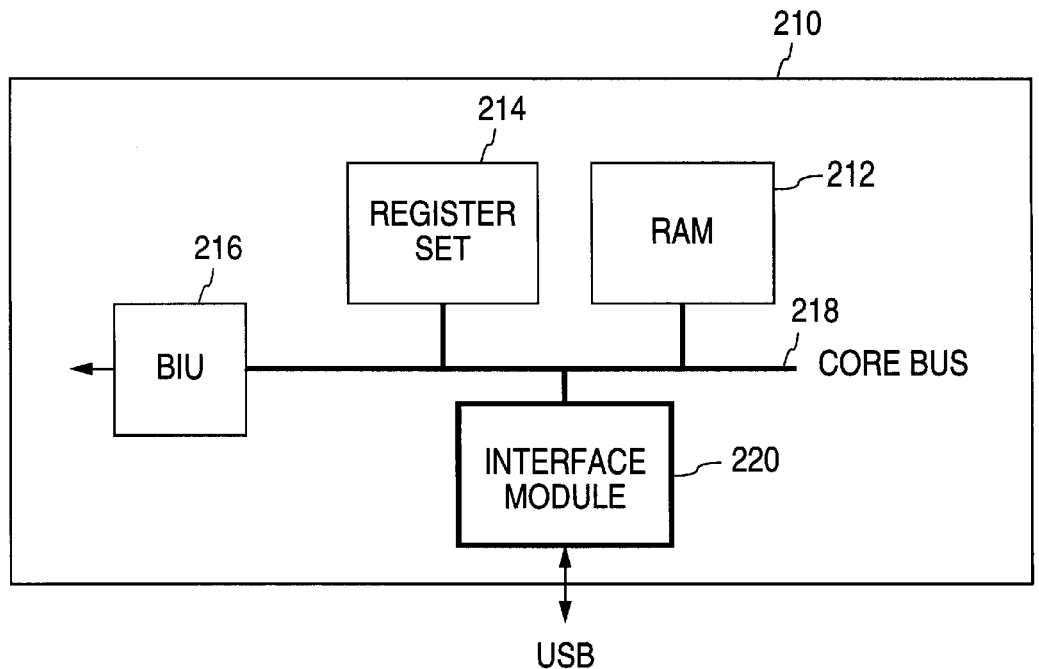
FIG. 2 is a block diagram of one preferred embodiment of an interface module for a Universal Serial Bus device in accordance with the present invention.
Figure 3:
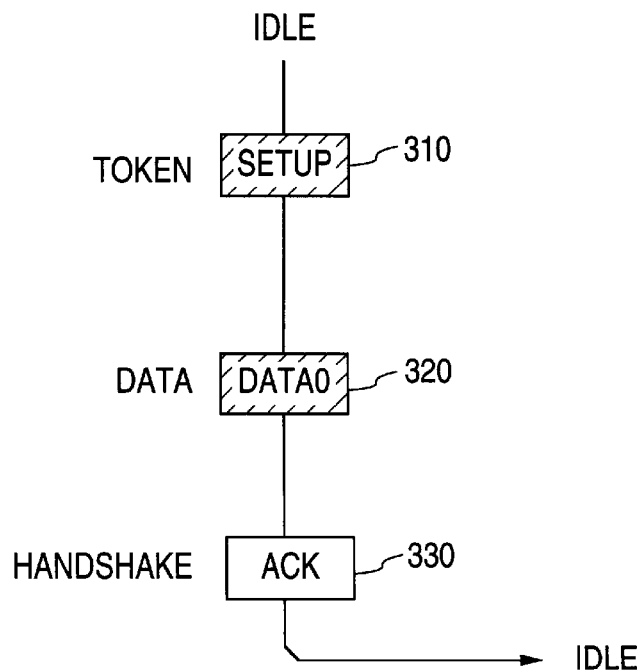
FIG. 3 is a flow chart showing data flow over a USB network during a SETUP transaction.
Figure 5:
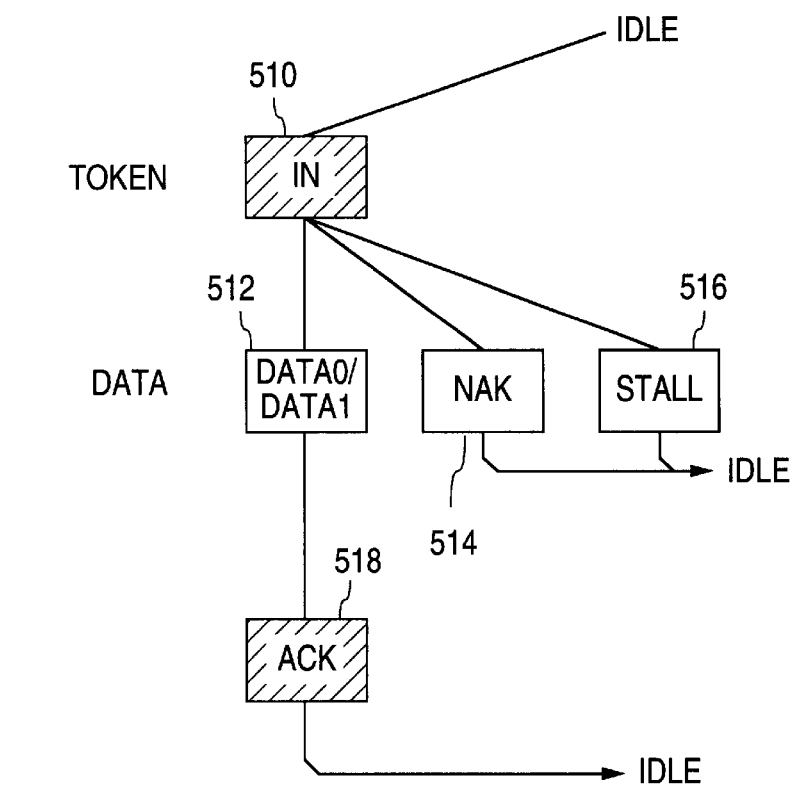
FIG. 5 is a flow chart showing data flow over a USB network during an IN transaction.
Figure 6:
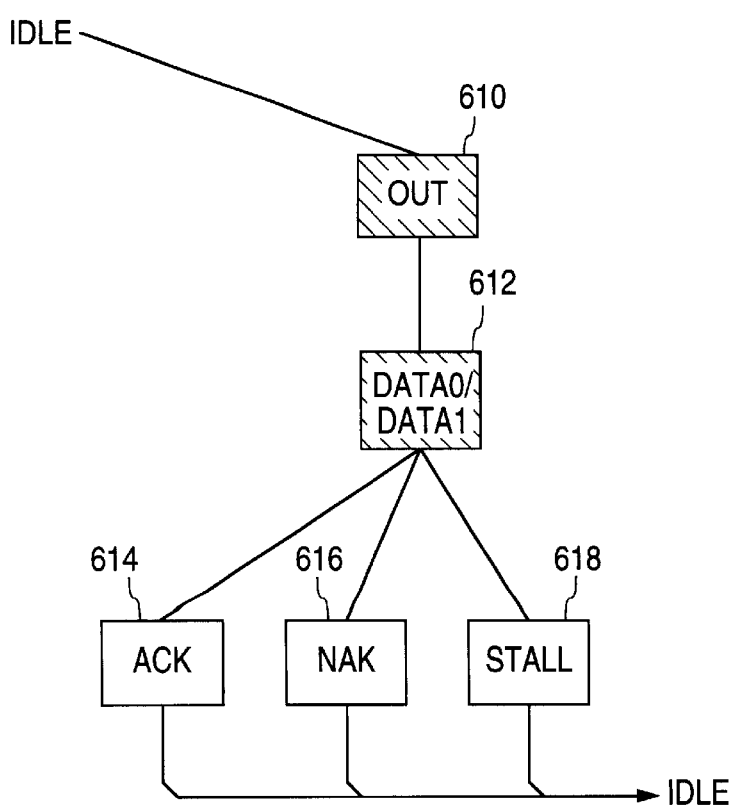
FIG. 6 is a flow chart showing data flow over a USB network during an OUT transaction.

With reference now to FIG. 2, a USB device 210 in accordance with the invention is described. The preferred embodiment of the device conforms to Revision 1.0 of the USB Specification while providing a number of advantages over conventional USB devices. The USB device 210 includes a USB interface module 220, a register set 214, a RAM 212, and a BIU 216.

The interface module 220 connects to a USB network to send and receive data. The interface module 200 also connects to register set 214, RAM 212, and BIU 216 via a core bus 218. The core bus 218 allows the interface module 200 to access the register set 214 and the RAM 212.

The register set 214 includes a functional address register and a device control register. Turning to FIG. 7, one preferred embodiment of a functional address register 710 is shown. The functional address register 710 is 32 bits long and provides space for four functional addresses.

Bits 0–6 of the functional address register 710 provide space for a first functional address designated FA0. Bit 7 provides space for a first address enable bit designated AE0. Bits 8–14 of the functional address register 710 provide space for a second functional address designated FA1. Bit 15 provides space for a second address enable bit designated AE1. Bits 16–22 of the functional address register 710 provide space for a third functional address designated FA2. Bit 23 provides space for a third address enable bit designated AE2. Bits 24–30 of the functional address register 710 provide space for a fourth functional address designated FA3. Bit 31 provides space for a first address enable bit designated AE3.

The four functional addresses, FA0, FA1, FA2, and FA3 along with the four address enable bits, AE0, AE1, AE2, and AE3 are provided to support the operation of a compound device having up to four address. After a functional address has been assigned, the related address enable bit may be set to enable use of the functional address.

Turning to FIG. 8, one preferred embodiment of a device control register 810 is shown. The device control register 810 is 16 bits long.

Bit 4 provides space for a first default address enable bit, DEF0, which relates to the first functional address, FA0. Bit 5 provides space for a second default address enable bit, DEF1, which relates to the second functional address, FA1. Bit 6 provides space for a third default address enable bit, DEF2, which relates to the third functional address, FA2. Bit 7 provides space for a fourth default address enable bit, DEF3, which relates to the fourth functional address, FA3.

The default address enable bits are used to indicate whether the device will respond to the default address. When these bits are set the device will respond to the default address, when they are cleared it will not.

After a functional address has been assigned, the related functional address bit is set to indicate that the address is valied. After this, the related default address bit will be cleared and the device will no longer respond to the default address and will instead respond to the functional address.

Figure 9:
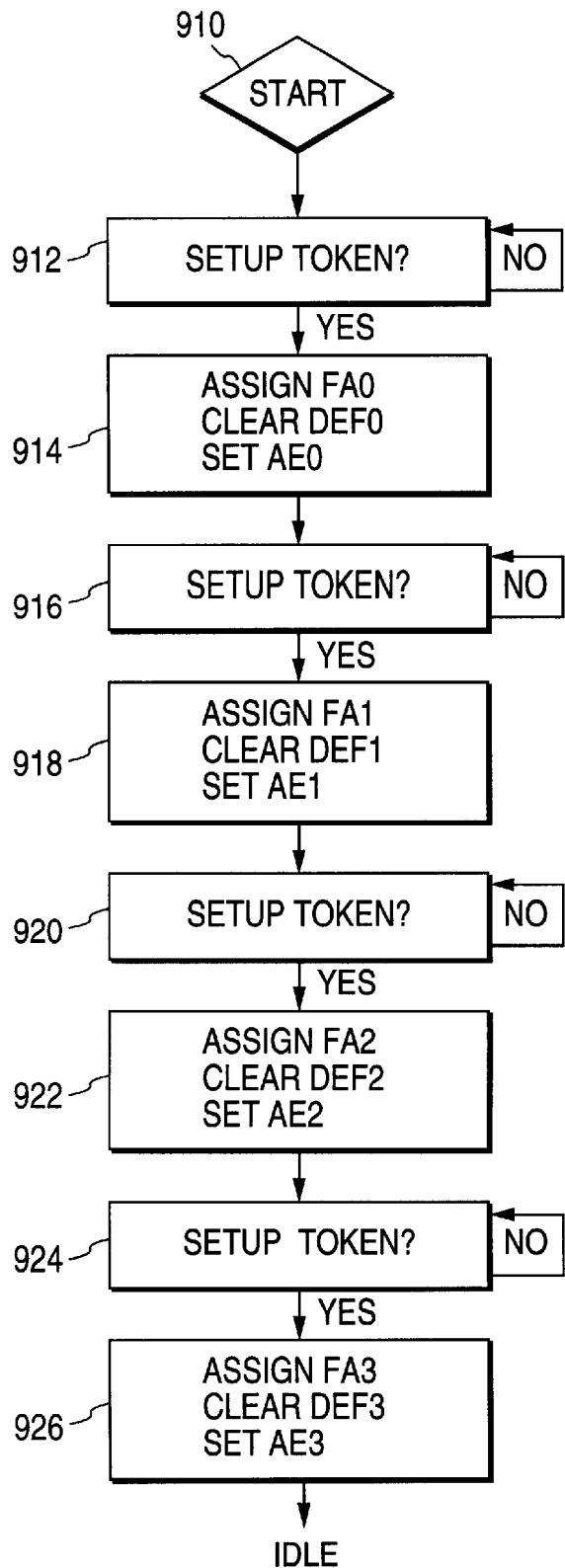
FIG. 9 is a flow chart showing the assignment of functional addresses according to one preferred embodiment of the invention.

Turning to FIG. 9, the assignment of functional addresses will now be described in detail. Starting at block 910, a USB device having four possible functional addresses is connected to a USB device. At block 912, the USB device tests for receipt of a SETUP token indicating a control transfer for assigning a functional address. Upon receipt of such a token, at block 914, the USB device performs the control transfer, assigns FA0, and sets AE0. DEF0 is cleared by the device the next time an ACK is received in response to an IN token. If no ACK is received within a timeout period, if the next token is a SETUP, this will also cause the DEF0 bit to be reset.

At block 916, the USB device again tests for receipt of a SETUP token indicating a control transfer for assigning a functional address. Upon receipt of such a token, at block 918, the USB device performs the control transfer, assigns FA1, and sets AE1. DEF1 is cleared as described above. At block 920, the USB device again tests for receipt of a setup token indicating a control transfer for assigning a functional address. Upon receipt of such a token, at block 922, the USB device performs the control transfer, assigns FA2, and sets AE2. DEF2 is cleared as described above. At block 924, the USB device again tests for receipt of a setup token indicating a control transfer for assigning a functional address. Upon receipt of such a token, at block 926, the USB device performs the control transfer, assigns FA3, and sets AE3. DEF3 is cleared as described above. This completes assignment of the four functional addresses.

Depending upon how many functional addresses have been assigned, the device 210 may respond to one or more assigned functional address and a default address.

Preferred embodiments of the device activate the functional addresses depending upon the particular needs of the implementation. Consequently, one to four functional addresses may be assigned.

Figure 10:
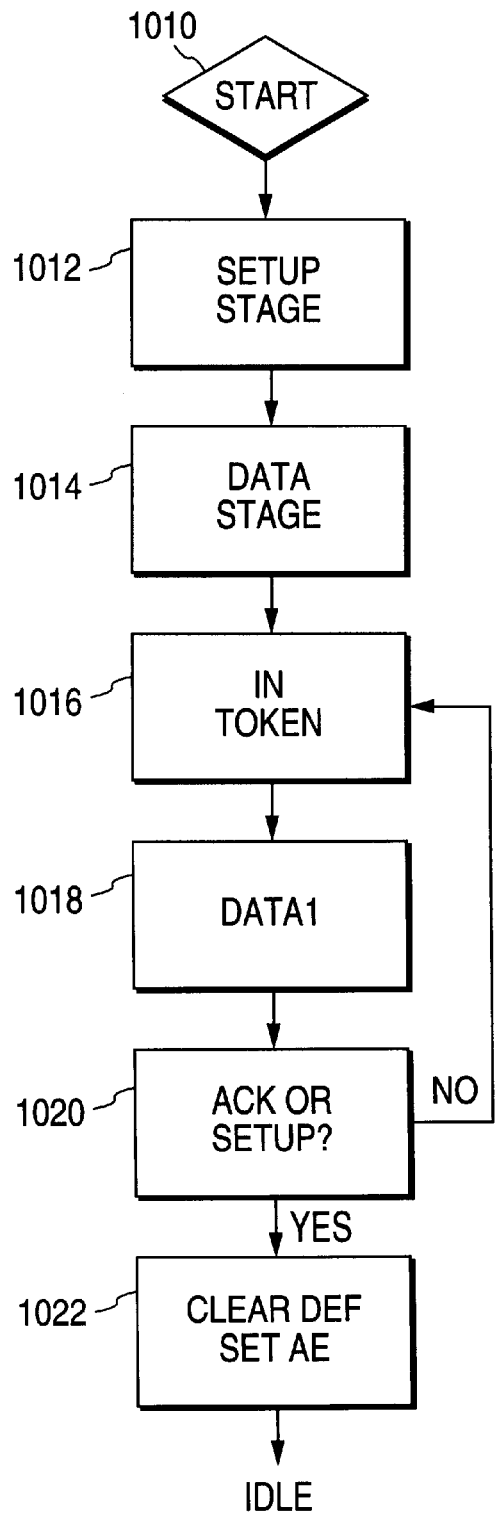
FIG. 10 is a flow chart showing a control transaction which assigns and enables a unique functional address according to one preferred embodiment of the invention.

The enablement of a functional address according to one preferred embodiment of the invention is shown in FIG. 10. At start block 1010 a USB device is connected to a USB network and tests for a SETUP token indicating a control transfer for assigning a functional address. Upon receipt of such a token the device proceeds to block 1012 where it completes a setup transaction. Upon completion of the setup transaction, the device proceeds to block 1014 to receive an OUT token. The device then proceeds to complete one or more OUT transactions. These transactions contain a unique functional address which is stored in the appropriate functional address register. Upon completion of the data stage at block 1014, the device tests for an IN token. Upon receipt of the IN token, the device proceeds to block 1018 where it sends a zero-length DATA1 packet. After sending the DATA1 packet, the device proceeds to block 1020, where it tests for receipt of either an ACK handshake or else another SETUP token. Upon receipt of either, the device proceeds to block 1022 where it clears the related DEF bit. This enables use of the unique functional address and disables use of the related default address.

If the device does not receive either an ACK handshake or a SETUP token at block 1020, it returns to block 1016 to test for receipt of a new IN token to restart the status stage. If the IN transaction is retried, (i.e. no ACK was received) the DEF bit will not be cleared. Thus when the transaction is retried to the Default address, it will still be received by this device.

By clearing the DEF bit only after receipt of an ACK handshake of an IN packet or a SETUP token, the device avoids problems associated with a lost or corrupted DATA1 packet or a lost or corrupted ACK handshake.

Specifically, if the DATA1 packet is lost or corrupted, the host will not send an ACK. Consequently, the host will continue to attempt to complete the initialization process by addressing the device at the default address. Since the device has not yet cleared the default bit, the device will still respond to the default address. This allows the host to reattempt a status stage by retransmitting an IN token to the default address.

If the ACK from the host is lost or corrupted, the device will not yet respond to it's unique functional address. However, as the host has no indication that the ACK was not received by the device, it must assume that the transaction has properly completed and that the device will now respond to it's functional address. Consequently, the host will continue with the process of enumerating the USB network. Upon transmission of a new SETUP token to a second device on the network, the first device will clear the default address bit and set the functional address bit. The first device will now respond to the functional address only.

Although the embodiments described herein are with reference to specific device structure, the present invention can be applied in a variety of other devices without departing from the scope of the invention. The invention has been described with reference to an embodiment having register space for a default address bit, an functional address enable bit, and a functional address register, however alternative equivalent embodiments may implement other register and memory configurations for enabling or disabling the default and unique functional address. Those having ordinary skill in the art will certainly understand from the embodiments disclosed herein that many modifications are possible without departing from the teachings hereof. All such modifications are intended to be encompassed within the following claims.

What is claimed is:

1. A method of operating a Universal Serial Bus (USB) device, wherein the USB device has a default address, and a default address enable bit, and wherein the default address enable bit enables the use of the default address, the method comprising:

receiving an IN token from the host;

sending DATA1 packet to the host;

receiving an ACK from the host; and clearing the default address enable bit only after receiving the ACK.

2. A method of operating a Universal Serial Bus (USB) device, wherein the USB device has a default address, and a default address enable bit, and wherein the default address enable bit enables the use of the default address, the method comprising:

receiving an IN token from the host;

sending a zero-length DATA1 packet to the host;

receiving a SETUP packet from the host; and clearing the default address enable bit upon receipt of the SETUP packet.

3. The method of claim 2, and further comprising the step of waiting a timeout period to receive an ACK.

4. A method of operating a Universal Serial Bus (USB) network, wherein the USB network includes a host and a plurality of devices, and wherein the devices have a default address and a default address enable bit, and further wherein the default address enable bit enables the use of the default address, the method comprising:

sending an IN token from the host to a first device;

receiving an IN token by the first device;

sending a DATA1 packet from the first device to the host;

receiving the DATA1 packet by the host sending an ACK from the host to the first device sending a SETUP token from the host to a second device; and clearing the default address enable bit of the first device upon receipt by the first device of one of the ACK or a subsequent token.

* * * * *